(12) United States Patent
Mahdi

(10) Patent No.: US 9,161,101 B2
(45) Date of Patent: *Oct. 13, 2015

(54) BEARER PATH OPTIMIZATION

(75) Inventor: Kaniz Mahdi, Carrollton, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 322 days.

This patent is subject to a terminal disclaimer.

(21) Appl. No.: 13/620,745

(22) Filed: Sep. 15, 2012

(65) Prior Publication Data

US 2013/0010785 A1 Jan. 10, 2013

Related U.S. Application Data

(63) Continuation of application No. 11/451,722, filed on Jun. 13, 2006, now Pat. No. 8,515,432.

(60) Provisional application No. 60/692,638, filed on Jun. 21, 2005.

(51) Int. Cl.
H04L 12/66 (2006.01)
H04Q 3/00 (2006.01)
H04M 7/12 (2006.01)
(Continued)

(52) U.S. Cl.
CPC .......... *H04Q 3/0025* (2013.01); *H04L 65/1043* (2013.01); *H04L 65/1069* (2013.01); *H04M 7/1255* (2013.01); *H04Q 3/0045* (2013.01);
(Continued)

(58) Field of Classification Search
USPC .......... 370/352, 355, 471, 466; 455/445, 436, 455/439
See application file for complete search history.

(56) References Cited

U.S. PATENT DOCUMENTS 5,497,411 A 3/1996 Pellerin
6,067,453 A * 5/2000 Adiwoso et al. .............. 455/430
(Continued)

FOREIGN PATENT DOCUMENTS

CA 2501991 A1 4/2004
WO 0060785 A1 10/2000
(Continued)

OTHER PUBLICATIONS

Article entitled "Draft FGNGN-FRA Version 3; TD 7 (WP 2/4)"; ITU-T Draft; Study Period 2005-2008; International Telecommunication Union, Geneva; CH, vol. 8/4, Feb. 15, 2005; pp. 1-64; XP017553890; by Rapporteur et al.
(Continued)

*Primary Examiner* — Thai Nguyen
(74) *Attorney, Agent, or Firm* — Conley Rose, P.C.; J. Robert Brown, Jr.

(57) ABSTRACT

Call control for originating and terminating calls in a visited circuit-switched subsystem (CS) or home multimedia subsystem (MS) as well as transferring calls between the visited CS and the home MS may be anchored at a continuity control function (CCF) in the home MS. Call signaling for the call may be passed through the CCF. When the user element is homed to the home MS and served by the visited CS, the bearer path for the call is established based on the relative proximity of the home MS and the visited CS. When a local MS is more proximate to the visited CS, the bearer path may be routed through a gateway in the local MS, instead of through the gateway in the home MS. When the home MS is sufficiently proximate to the visited CS, the bearer path is routed through the gateway in the home MS.

20 Claims, 14 Drawing Sheets

(51) Int. Cl.
*H04W 76/02* (2009.01)
*H04L 29/06* (2006.01)

(52) U.S. Cl.
CPC ......... *H04W 76/022* (2013.01); *H04L 65/1016* (2013.01)

(56) References Cited

U.S. PATENT DOCUMENTS

| | | | |
|---|---|---|---|
| 6,208,627 | B1 | 3/2001 | Menon et al. |
| 6,353,596 | B1 | 3/2002 | Grossglauser et al. |
| 6,721,565 | B1 | 4/2004 | Ejzak et al. |
| 6,961,774 | B1 | 11/2005 | Shannon et al. |
| 8,515,432 | B2 | 8/2013 | Mahdi |
| 2002/0133600 | A1 | 9/2002 | Williams et al. |
| 2003/0027569 | A1* | 2/2003 | Ejzak ............... 455/432 |
| 2003/0174688 | A1* | 9/2003 | Ahmed et al. ........ 370/349 |
| 2004/0157600 | A1 | 8/2004 | Stumpert et al. |
| 2004/0190498 | A1 | 9/2004 | Kallio et al. |
| 2004/0246990 | A1 | 12/2004 | Krishnamurthi et al. |
| 2004/0249887 | A1 | 12/2004 | Garcia-Martin et al. |
| 2005/0002407 | A1 | 1/2005 | Shaheen et al. |
| 2005/0003797 | A1 | 1/2005 | Baldwin |
| 2005/0286531 | A1 | 12/2005 | Tuohino et al. |
| 2006/0002355 | A1 | 1/2006 | Baek et al. |
| 2006/0034270 | A1 | 2/2006 | Haase et al. |
| 2006/0072549 | A1 | 4/2006 | Goldman et al. |
| 2006/0083199 | A1 | 4/2006 | Yang |
| 2006/0209805 | A1* | 9/2006 | Mahdi et al. ........ 370/352 |
| 2007/0004415 | A1 | 1/2007 | Abedi |
| 2007/0014281 | A1 | 1/2007 | Kant |
| 2007/0100981 | A1 | 5/2007 | Adamczyk et al. |

FOREIGN PATENT DOCUMENTS

| | | | |
|---|---|---|---|
| WO | 0103450 | A1 | 1/2001 |
| WO | 0122657 | A1 | 3/2001 |
| WO | 2004019173 | A2 | 3/2004 |

OTHER PUBLICATIONS

European Search Report dated Jun. 25, 2013.
Extended European Search Report; Application No. 14183001.8; Dec. 23, 2014; 9 pages.
3GPP TR 23.806 V0.2.1; 3rd Generation Partnership Project; Technical Specification Group Services and System Aspects; Voice Call Continuity Between CS & IMS Study; Release 7; Apr. 2005; 118 pages.
Strater, Jay, et al.; "Seamless Mobility Between Home Networks and Cable Services"; Motorola; May 27, 2005; 17 pages.
Office Action dated Apr. 2, 2009; U.S. Appl. No. 11/451,722, filed Jun. 13, 2006; 13 pages.
Office Action dated Oct. 14, 2009; U.S. Appl. No. 11/451,722, filed Jun. 13, 2006; 15 pages.
Final Office Action dated Apr. 2, 2010; U.S. Appl. No. 11/451,722, filed Jun. 13, 2006; 17 pages.
Office Action dated Dec. 9, 2010; U.S. Appl. No. 11/451,722, filed Jun. 13, 2006; 13 pages.
Final Office Action dated May 24, 2011; U.S. Appl. No. 11/451,722, filed Jun. 13, 2006; 13 pages.
Notice of Allowance dated Mar. 15, 2012; U.S. Appl. No. 11/451,722, filed Jun. 13, 2006; 11 pages.
Notice of Allowance dated Mar. 19, 2013; U.S. Appl. No. 11/451,722, filed Jun. 13, 2006; 7 pages.
PCT International Search Report; Application No. PCT/IB2006/001564; Nov. 14, 2006; 2 pages.
PCT Written Opinion of the International Searching Authority; Application No. PCT/IB2006/001564; Nov. 14, 2006; 4 pages.
PCT International Search Report; Application No. PCT/IB2006/000607; Aug. 28, 2006; 2 pages.
PCT Written Opinion of the International Searching Authority; Application No. PCT/IB2006/000607; Aug. 28, 2006; 5 pages.
PCT International Search Report; Application No. PCT/IB2006/001362; Oct. 5, 2006; 4 pages.
PCT Written Opinion of the International Searching Authority; Application No. PCT/IB2006/001362; Oct. 5, 2006; 6 pages.
PCT International Search Report; Application No. PCT/IB2006/002282; Feb. 2, 2007; 3 pages.
PCT Written Opinion of the International Searching Authority; Application No. PCT/IB2006/002282; Feb. 2, 2007; 4 pages.

* cited by examiner

BEARER PATH OPTIMIZATION

CROSS-REFERENCE TO RELATED APPLICATIONS

This application claims the benefit of U.S. provisional patent application Ser. No. 60/692,638, filed in the U.S. Patent and Trademark Office on Jun. 21, 2005, the disclosure of which is incorporated herein by reference in its entirety. This application is related to U.S. utility patent application Ser. No. 11/378,776 filed on Mar. 17, 2006, the disclosure of which is hereby incorporated by reference in its entirety.

FIELD OF THE INVENTION

The present invention relates to communications, and in particular to providing a centralized control function for supporting calls over circuit-switched subsystems and multimedia subsystems as well as optimizing the bearer path for the calls while maintaining centralized control.

BACKGROUND OF THE INVENTION

Packet communications have evolved to a point where voice sessions, or calls, can be supported with essentially the same quality of service as that provided by circuit-switched communications. Packet communications are generally supported over packet subsystems, which were initially supported by local area networks, but are now supported by wireless local area networks (WLANs). Using WLAN access, user elements can support voice sessions using packet communications while moving throughout the WLAN. As such, WLAN access provides users the same freedom of movement within a WLAN as cellular access provides users within a cellular environment.

In many instances, the coverage areas provided by WLANs and cellular networks are complementary. For example, a WLAN may be established within a building complex in which cellular coverage is limited. Given the localized nature of WLAN coverage, cellular networks could bridge the coverage gaps between WLANs. Unfortunately, WLAN access technology is independent of cellular access technology. Cellular networks generally support circuit-switched communications, and WLANs support packet communications. As such, user elements have been developed to support both cellular and WLAN communications using different communication interfaces. With these user elements, users can initiate and receive calls via the cellular network and WLAN using the respective communication interfaces.

In co-pending U.S. patent application Ser. No. 11/378,776, filed Mar. 17, 2006, and entitled CIRCUIT-SWITCHED AND MULTIMEDIA SUBSYSTEM VOICE CONTINUITY, which is incorporated herein by reference, applicant has proposed moving a user element's service control, including call control, from a cellular network to a multimedia subsystem (MS), such as the Internet Protocol (IP) Multimedia Subsystem (IMS). As such, call control is provided by the MS irrespective of whether the user element is using cellular or WLAN access for the call. For clarity and conciseness, a cellular network providing circuit-switched communications is referred to as circuit-switched subsystem (CS), and a WLAN providing packet communications is assumed to be part of or associated with the MS. In general, wireless communication techniques having relatively limited range, such as WLAN techniques, are referred to as local wireless communication techniques. Thus, local wireless communication techniques support packet-based communications, wherein cellular communication techniques will generally support circuit-switched communications. Further, the wireless access for local wireless techniques are of a limited range with respect to cellular access techniques.

Call control for originating and terminating calls in the CS or MS as well as transferring calls between the CS and MS is anchored at a continuity control function (CCF) in the MS. All call signaling for the call is passed through the CCF. The CCF is a service provided in the user element's home MS and anchors the user element's active CS calls and MS sessions to enable mobility across the CS and MS while maintaining CS calls or MS sessions.

For CS calls, the CCF operates to anchor the bearer path for calls originated or terminated through the CS by the user element at a media gateway, which is controlled by a media gateway controller of the home MS. The CCF employs Third Party Call Control function to provide call control in the CS. For MS calls, the CCF provides call control by interacting with the user element and a remote endpoint to establish a bearer path directly between the user element and the remote endpoint through the MS. The CCF is addressable using public service identities (PSI). In the CS, a directory number associated with the CCF is used for routing call signaling messages within the CS. In the MS, a uniform resource location (URL) associated with the CCF is used for routing call signaling messages within the MS. In the following description, 3GPP TS 24H.008 (DTAP) is used in the CS, while the Session Initiation Protocol (SIP) is used in the MS to effect origination, termination, and transfer of calls. Those skilled in the art will recognize other applicable and useful protocols as substitutes for DTAP and SIP.

Turning now to FIG. 1, a communication environment 10 is illustrated where a home MS 12H and a visited CS 14 support communications for a user element 16. The user element 16 includes a CS client 18 and an MS client 20, which are configured to support circuit-switched communications via the visited CS 14 as well as packet communications via the home MS 12H, respectively. For communications within the visited CS 14, a visited mobile switching center (VMSC) 22 will support circuit-switched communications for the user element 16. The VMSC 22 may interact with the home MS 12H via a media gateway controller (MGC) 24H and an associated media gateway (MG) 26H, both of which are affiliated with the MS 12H.

The home MS 12H may include various functions or entities, including an interrogating and serving call/session control function (I/S-CSCF) 28, a CCF 30, an application server (AS) 32, and a home subscriber service (HSS) 34. Notably, the interrogating CSCF provides the standard I-CSCF functions and the serving CSCF provides standard S-CSCF functions. These functions are represented in the I/S-CSCF 28 for conciseness. Further, the HSS 34 may have a presence in both the visited CS 14 and the home MS 12H. The HSS 34 may include a home location resource component for home CS. Call/session control functions (CSCFs) in the home MS 12H generally act as SIP proxies and provide various functions in association with call control, as will be appreciated by those skilled in the art. In operation, an interrogating CSCF (I-CSCF) may interact with the HSS 34 to identify the serving CSCF (S-CSCF), which will be assigned to support a given user element. The HSS 34 may maintain an association between a user element 16 and a particular CCF 30 that is assigned to the user element 16. As such, the HSS 34 will assist in identifying a serving CSCF for the user element 16, as well as keep an association between a particular CCF 30 and the user element 16. The CCF PSI for the user element 16 may be provisioned in the user element 16 to enable the user element 16 to initiate transfers and the like controlled by the CCF 30. Alternatively, the CCF PSI may be transferred to the user element 16 upon network registration.

Depending on whether the user element 16 is registered in the home MS 12H, different techniques may be used to access the home MS 12H. When the user element 16 is registered in the home MS 12H, the user element 16 will have an S-CSCF assigned to it, and will use that S-CSCF to access the CCF 30. When the user element 16 is not registered in the home MS 12H, a temporary S-CSCF may be assigned to the user element 16, and the temporary S-CSCF will be used to access the CCF 30.

The application servers 32 may be invoked and placed within the call signaling path to implement any number of features or services. When a particular application service provided by an application server 32 is invoked, all signaling for the associated call or session is passed through the application service, which has the opportunity to process call signaling messages as necessary to implement the desired service. Notably, the CCF 30 acts like a service, and as such, the I/S-CSCF 28 will operate to pass all call signaling messages for the call through the CCF 30, thereby allowing the CCF 30 to act as an anchor for the call.

In FIG. 1, the user element 16 is engaged in a call supported by the CS client 18 and controlled by the CCF 30. As such, call signaling for the call passes through the VMSC 22, media gateway controller 24H, I/S-CSCF 28, CCF 30, and perhaps application server 32, if a service is invoked, on its way toward a remote endpoint 36. Notably, the access signaling leg, which is provided by the visited CS 14, is anchored at the CCF 30 and extends through the I/S-CSCF 28, media gateway controller 24H, the VMSC 22, and CS client 18 of the user element 16. The remote signaling leg toward the remote endpoint 36 is anchored in the CCF 30 and extends through the I/S-CSCF 28 and the application server 32. In this configuration, the CCF 30 can maintain control of the call and provide any necessary call processing during the call. Further, if a call transfer is required, the CCF 30 maintains the remote signaling leg and establishes a new access signaling leg.

The bearer path for the call illustrated in FIG. 1 extends from the CS client 18 through the VMSC 22 and media gateway 26H on its way toward the remote endpoint 36. Notably, the media gateway controller 24H cooperates with the media gateway 26H, such that a circuit-switched connection may be established between the media gateway 26H and the CS client 18 via the VMSC 22. The packet session may be established for the call from the media gateway 26H through the home MS 12H toward the remote endpoint 36.

With reference to FIG. 2, a call supported by the MS client 20 of the user element 16 is represented. Notably, the call does not extend through the visited CS 14, and will not employ the services of the VMSC 22, media gateway controller 24H, or media gateway 26H. Instead, the MS client 20 will support call signaling directly with the home MS 12H, and in particular with the CCF 30 via a serving-CSCF (S-CSCF) 40. Notably, the I/S-CSCF 28 and the S-CSCF 40 may represent the same CSCF or different CSCFs, depending on how the user element 16 registers with the home MS 12H.

As illustrated, call signaling is anchored in the CCF 30, wherein an access signaling leg is provided between the CCF 30 and the MS client 20 via the S-CSCF 40. A remote signaling leg is supported between the remote endpoint 36 and the CCF 30 via the S-CSCF 40 and any desired application servers 32 that may provide additional services in association with the call. The bearer path will extend from the MS client 20 toward the remote endpoint 36 via the home MS 12H, without traveling through the visited CS 14 (FIG. 1). Again, the CCF 30 anchors the call, such that if transfer is required, the remote signaling leg toward the remote endpoint 36 can be maintained, while the access signaling leg may be changed to facilitate the transfer from the home MS 12H to the visited CS 14. For transfer of calls between the visited CS 14 and the home MS 12H, the access signaling legs illustrated in FIGS. 1 and 2 will be changed to support the transfer, while the remote signaling leg is maintained by the CCF 30.

When the user element 16 is originating a call, the CCF 30 appears as a service provided by an application server, such as the application server 32. The CCF 30 may be invoked as the first service in a chain of services. When the user element 16 is terminating a call, the CCF 30 is invoked as the last service in a chain of services. By locating the CCF 30 with respect to the other services in this manner, other applications associated with the call are anchored by the CCF 30 as part of the remote signaling leg of the call, and are therefore not impacted by transfers affecting the access signaling leg.

The MSISDN or other user element identifier is owned and controlled by the home MS 12H to enable anchoring of incoming calls intended for the user element 16 at the CCF 30. Incoming calls destined for the user element 16 and originated from the visited CS 14, the public switched telephone network (PSTN), or other MS can be anchored at the CCF 30 by setting up routing functions at the originating service nodes, such that incoming calls intended for the user element 16 are delivered to the home MS 12H. As such, the CCF 30 can take the necessary steps to find the user element 16 and route the call to the user element 16, even if the user element 16 is in the visited CS 14 when the call arrives.

As indicated, the HSS 34 may store filter criteria associated with the CCF 30 as part of the user element's subscription profile. The CCF filter criteria is downloaded to the currently assigned S-CSCF (28 or 40) as part of the initial filter criteria to use when the user element 16 registers with the home MS 12H. This filter criteria is generally executed at the S-CSCF 40 (or 28) upon initiation of a call or session from the user element 16 or upon receipt of an incoming session intended for the user element 16. These filter criteria will instruct the S-CSCF 40 (or 28) to invoke the CCF 30 to control at least the bearer path for the call or session.

As illustrated in FIG. 1, when the user element 16 is being served by the visited CS 14, which is located a relatively long distance from the home MS 12H, routing the bearer path to the media gateway 26H in the home MS 12H may induce some backhaul inefficiencies. As such, the bearer path may be indirectly routed between the user element 16 and the remote endpoint 36 through the media gateway 26H instead of being more directly routed through the visited CS 14 and more local networks.

Accordingly, there is a need for a technique to effectively support calls for the user element 16 over both the visited CS 14 and the home MS 12 at the CCF 30. In conjunction, there is a further need to construct a more efficient bearer path between the user element 16 and the remote endpoint 36 when the visited CS 14 is located a relatively long distance from the home MS 12H.

SUMMARY OF THE INVENTION

For the present invention, call control for originating and terminating calls in a visited CS or home MS as well as transferring calls between the visited CS and the home MS may be anchored at a CCF in the home MS as described above. The user element is homed to the home MS. When the CCF is invoked, call signaling for the call is passed through the CCF.

When the user element is served by the visited CS, the bearer path for the call is established based on the relative proximity of the home MS and the visited CS. When a local MS is more proximate to the visited CS, the bearer path may be routed through a gateway in the local MS, instead of through the gateway in the home MS. When the home MS is sufficiently proximate to the visited CS or more proximate to the visited CS than the local MS, the bearer path is routed through the gateway in the home MS. The present invention reduces the length of the time division multiplexed (TDM) portion of the bearer path by selectively invoking the gateway in the local MS based on the relative proximities of the local MS and the home MS to the visited CS. As such, the TDM portion of the bearer path extending from the visited CS may be selectively routed to the gateway in the local MS to avoid an unduly long run to the gateway in the home MS, when there is a local MS available.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

For the present invention, call control for originating and terminating calls in the visited CS or home MS as well as transferring calls between the visited CS and the home MS may be anchored at the CCF in the home MS as described above. The user element is homed to the home MS. When the CCF is invoked, call signaling for the call is passed through the CCF.

When the user element is served by the visited CS, the bearer path for the call is established based on the relative proximity of the home MS and the visited CS. When a local MS is more proximate to the visited CS, the bearer path may be routed through a gateway in the local MS, instead of through the gateway in the home MS. When the home MS is sufficiently proximate to the visited CS or more proximate to the visited CS, the bearer path is routed through the gateway in the home MS. The present invention reduces the length of the time division multiplexed (TDM) portion of the bearer path by selectively invoking the gateway in the local MS based on the relative proximities of the local MS and the home MS to the visited CS. As such, the TDM portion of the bearer path extending from the visited CS may be selectively routed to the gateway in the local MS to avoid an unduly long run to the gateway in the home MS, when there is a local MS available.

Figure 1:
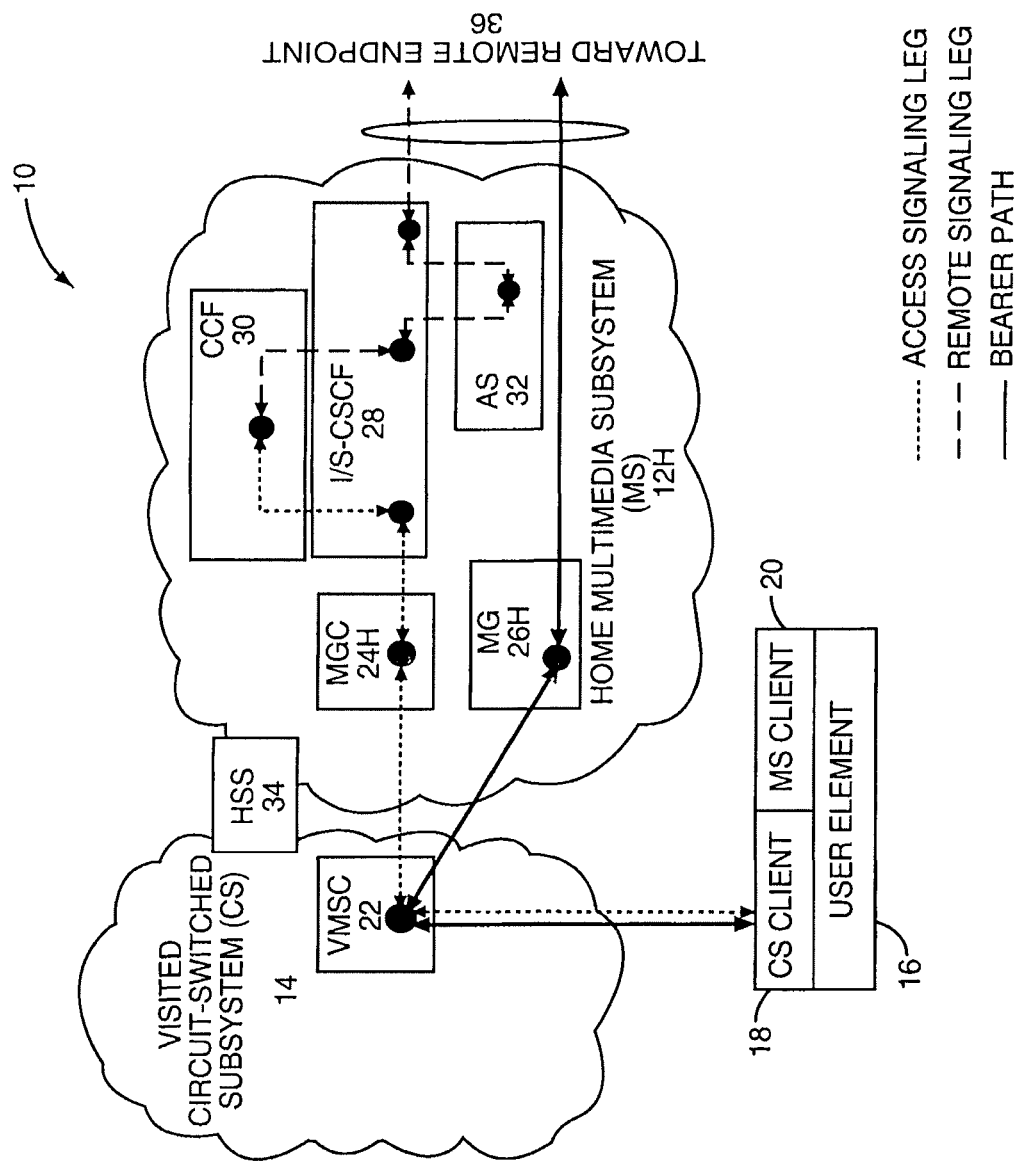
FIG. 1 is a communication environment illustrating circuit-switched subsystem access for a user element.
Figure 2:
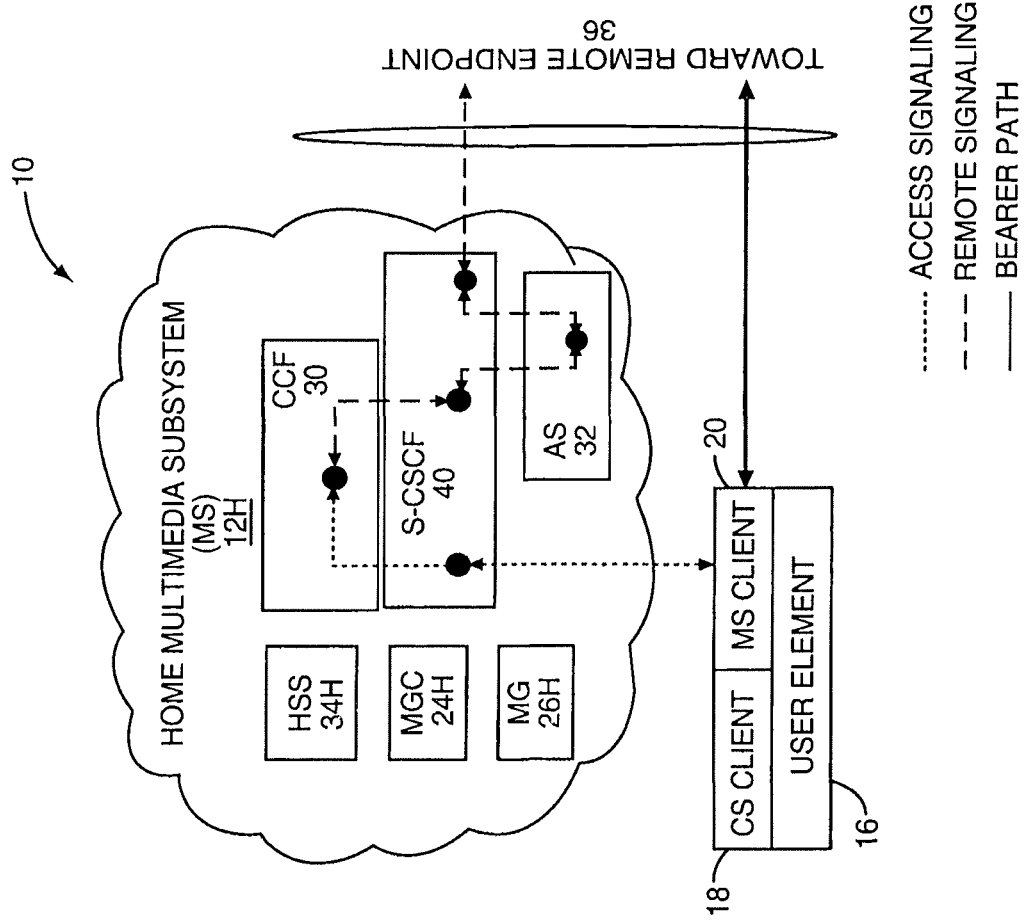
FIG. 2 is a communication environment illustrating multimedia subsystem access for a user element.
Figure 3:
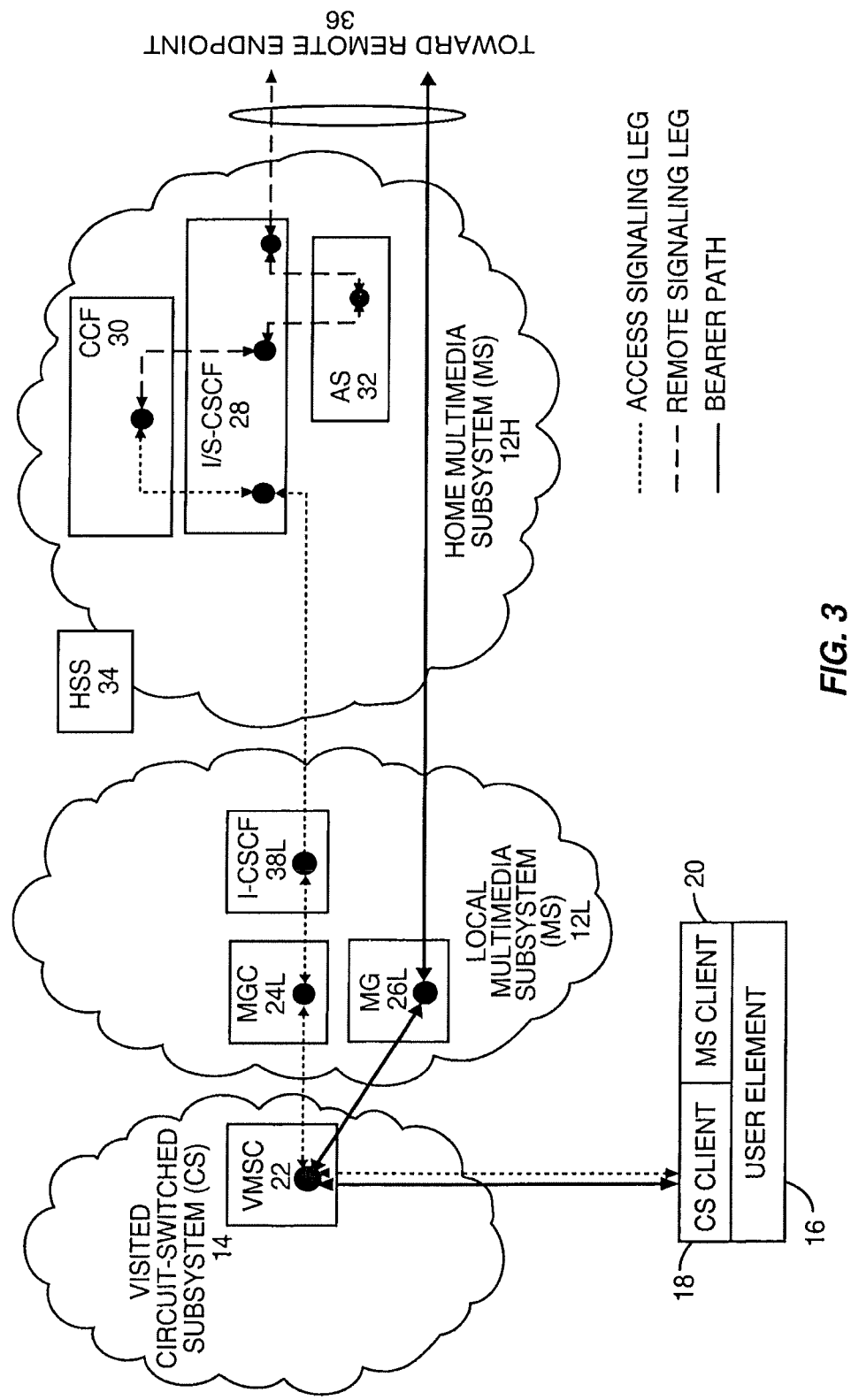
FIG. 3 is a communication environment illustrating circuit-switched subsystem access for a user element according to a first embodiment of the present invention.

With particular reference to FIG. 3, the bearer path, access signaling leg, and remote signaling leg for a call originated from the user element 16 to the remote endpoint 36 are shown according to one embodiment of the present invention. In this embodiment, the user element 16 is homed to the home MS 12H and roaming into the visited CS 14. The remote endpoint 36 is currently being served by the home MS 12H. When the visited CS 14 is not proximate to the home MS 12H, call signaling is still anchored at the CCF 30 in the home MS 12H. However, the TDM portion of the bearer path is not established to the media gateway 26H in the home MS 12H as provided in FIG. 1. Instead, the TDM portion of the bearer path is established to a media gateway 26L in a local MS 12L, which is more proximate to the visited CS 14 than the home MS 12H. The packet portion of the bearer path is established from the media gateway 26L to the remote endpoint 36 via the home MS 12H.

The access signaling leg to the CCF 30 is established via the VMSC 22 in the visited CS 14, a media gateway controller 24L of the media gateway 26L in the local MS 12L, an interrogating CSCF (I-CSCF) 38L in the local MS 12L, and the I/S-CSCF 28 in the home MS 12H. As such, the present invention establishes the bearer path through the local MS 12S, which is proximate to the visited CS 14, instead of through the home MS 12H to provide more efficient bearer path routing when the home MS 12H is not proximate to the visited CS 14. Control of the call is maintained at the CCF 30.

Figure 4A:
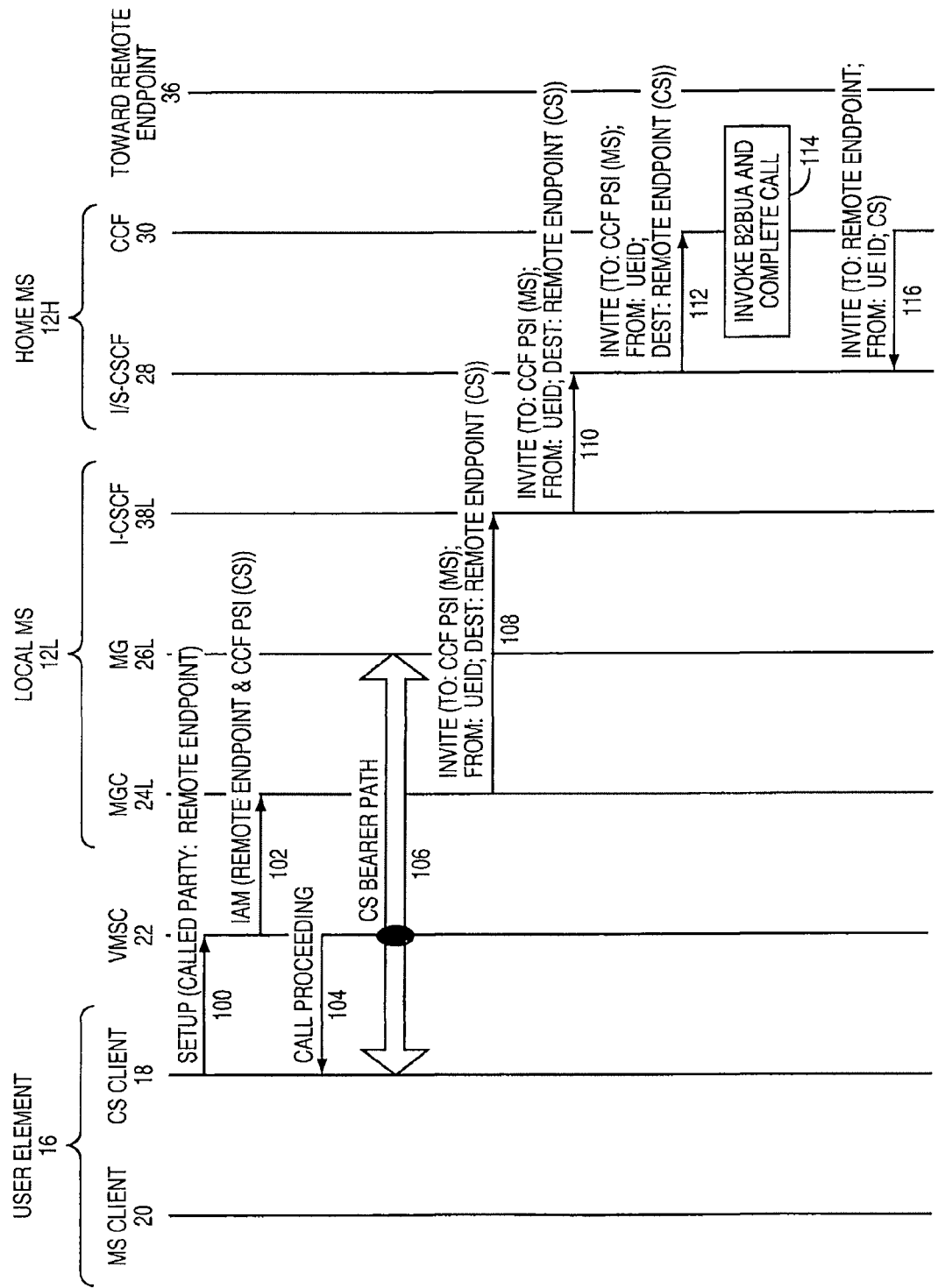
FIGS. 4A-4C show a communication flow illustrating originating a call via the circuit-switched subsystem according to one embodiment of the present invention.
Figure 4B:
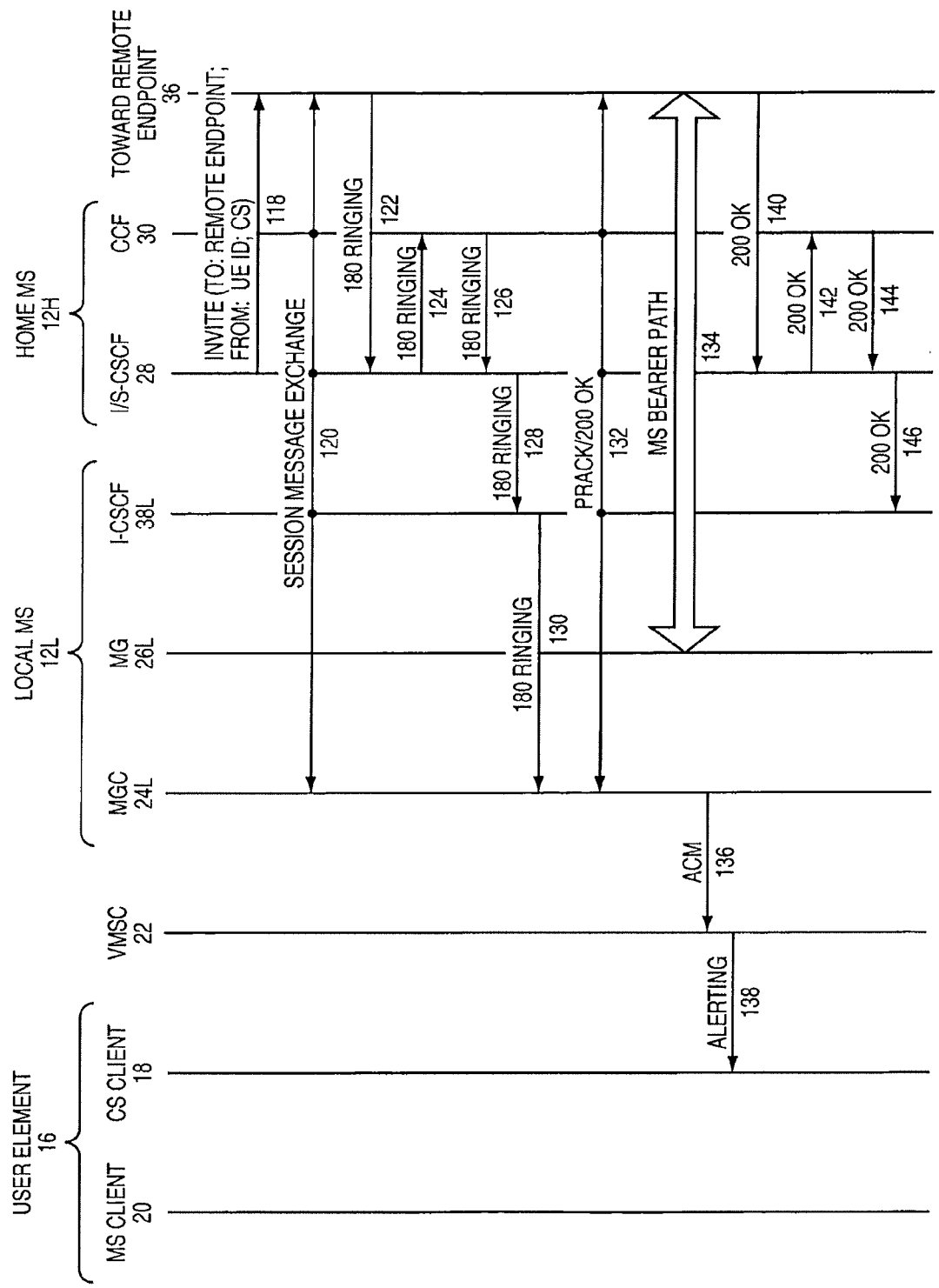
Figure 4C:
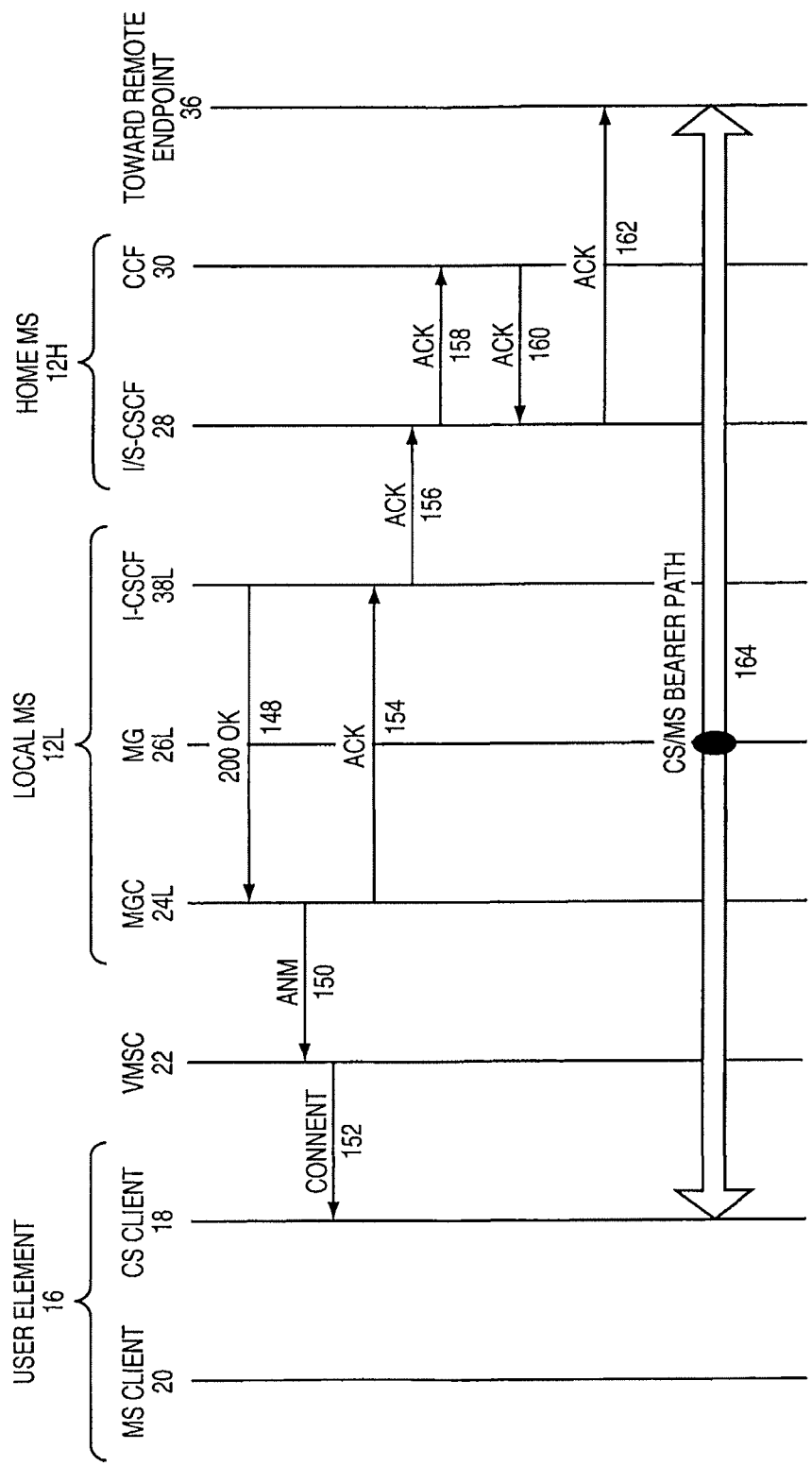

With reference to FIGS. 4A through 4C, a communication flow is provided to illustrate origination of a call from the CS client 18 of the user element 16 via the visited CS 14 according to one embodiment of the present invention. The user element 16 is homed to the home MS 12H and roaming into the visited CS 14, and the remote endpoint 36 is currently being served by the home MS 12H of the user element 16. Initially, the CS client 18 will send a call setup message to its supporting VMSC 22 in the visited CS 14 (step 100). The call setup message will identify the directory number of the remote endpoint 36. The VMSC 22 is provisioned to initially route the call through the more proximate local MS 12L instead of the more distant home MS 12H. As such, the VMSC 22 will send the media gateway controller 24L in the local MS 12L an Integrated Services User Part (ISUP) Initial Address Message (IAM) addressing a routing number that identifies the remote endpoint 36, as well as including the CS PSI for the CCF 30, which is located in the home MS 12H (step 102). The VMSC 22 will also provide a Call Proceeding message back to the CS client 18 of the user element 16 to indicate the call is progressing (step 104). This exchange results in a TDM-based CS bearer path being established from the CS client 18 to the media gateway 26L in the local MS 12L via the VMSC 22 (step 106). The media gateway controller 24L may act as a user agent on behalf of the user element 16.

Upon receiving the IAM from the VMSC 22, the media gateway controller 24L will send an Invite to the I-CSCF 38L in the local MS 12L (step 108). When generating the Invite, the media gateway controller 24L will identify the MS-based PSI for the CCF 30 in light of the CS-based PSI received in the IAM. The MS-based PSI for the CCF 30 is the address to which the Invite is intended. The Invite will also identify the user element 16 as the originator of the call and identify the remote endpoint 36 as the destination for the call. The Invite may also indicate that the call was originated through the CS 14.

Upon receipt of the Invite, the I-CSCF 38L will identify the home MS 12H of the user element 16 and send an Invite to the I/S-CSCF 28 in the home MS 12H to initiate establishment of a packet-based MS bearer path toward the remote endpoint 36 for which the call is intended from the media gateway 26L (step 110). The I/S-CSCF 28 will recognize the need to invoke the CCF 30 for the call, and will send the Invite to the CCF 30 (step 112), which may invoke a back-to-back user agent (B2BUA) and then take the necessary steps to complete the call (step 114). As such, the CCF 30 will send an Invite back to the I/S-CSCF 28 to complete the call (step 116). The Invite will now include the address of the remote endpoint 36 or a supporting node with which a packet session can be established. The Invite will identify the media gateway controller 24L of the media gateway 26L as the other endpoint for the packet session that will support the call. The I/S-CSCF 28 will then send the Invite toward the remote endpoint 36 (step 118). At this point, the traditional session message exchange between the remote endpoint 36 and the media gateway controller 24L in the local MS 12L will take place through the CCF 30, perhaps the I-CSCF 38L, and the I/S-CSCF 28 to prepare the respective remote endpoint 36 and media gateway 26L to support the MS bearer leg (step 120).

In the meantime, the I/S-CSCF 28 may receive various signaling back from the remote endpoint 36, such as a 180 Ringing message (step 122). The 180 Ringing message indicates that the call is being presented to the remote endpoint 36. The I/S-CSCF 28 will route all signaling messages through the CCF 30, and as such, the 180 Ringing message is sent to the CCF 30 (step 124), which will forward the message back to the I/S-CSCF 28 (step 126). The I/S-CSCF 28 will send the 180 Ringing message to the media gateway controller 24L in the local MS 12L directly or via the I-CSCF 38L (steps 128 and 130). After a Provisional Acknowledgement (PRACK) and 200 OK message exchange between the media gateway controller 24L and the remote endpoint 36 through the CCF 30 (step 132), the MS bearer path is effectively established (step 134), which means that the media gateway 26 and the remote endpoint 36 can send packets back and forth in association with the call.

The media gateway controller 24L will send an Address Complete Message (ACM) to the VMSC 22 (step 136), which will send an Alerting message to the user element 16 to indicate that call is being presented to the remote endpoint 36 (step 138). When the call is answered by the remote endpoint 36, the I/S-CSCF 28 will receive a 200 OK message (step 140) and route the 200 OK message to the CCF 30 (step 142). The CCF 30 will process the message if necessary, and then send the message back to the I/S-CSCF 28 (step 144), which will forward the 200 OK message to the media gateway controller 24L directly or via the I-CSCF 38L (steps 146 and 148). The media gateway controller 24L will send an Answer Message (ANM) to the VMSC 22 (step 150), which will send a Connect message to the CS client 18 (step 152) to indicate that the call has been answered. To complete the call, the media gateway controller 24L will provide appropriate signaling to the media gateway 26L, as well as send an acknowledgement (ACK) message back to the I/S-CSCF 28 directly or via the I-CSCE 38L (steps 154 and 156). The I/S-CSCF 28 will again forward the ACK to the CCF 30 (step 158), which will forward the message back to the I/S-CSCF 28 (step 160). The I/S-CSCF 28 will then send the ACK toward the remote endpoint 36 (step 162).

At this point, a CS/MS bearer path is established between the CS client 18 of the user element 16 and the remote endpoint 36 via the media gateway 26 (step 164). The TDM portion of the CS/MS beater path extends from the VMSC 22 to the media gateway 26L in the local MS 12L instead of the media gateway 26H in the home MS 12H to provide a shorter, more efficient bearer path. However, the call signaling associated with the call will be routed through the CCF 30. Notably, the back-to-back user agent invoked by the CCF 30 is the function that represents an endpoint for signaling associated with the remote signaling leg as well as an endpoint for the access signaling leg. The back-to-back user agent will provide any necessary processing or filtering and then relay messages over the respective access and remote signaling legs.

Figure 5:
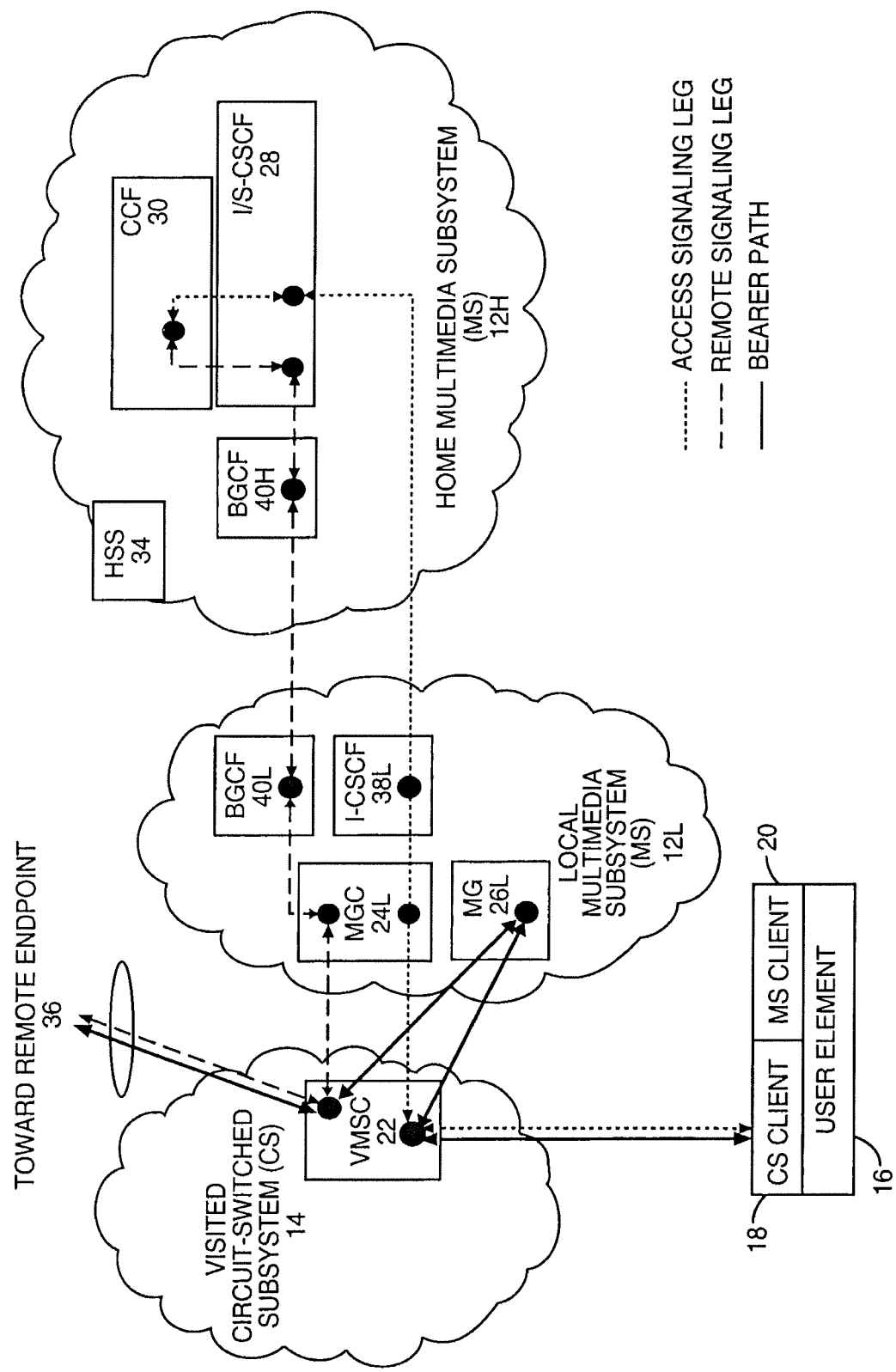
FIG. 5 is a communication environment illustrating circuit-switched subsystem access for a user element according to a second embodiment of the present invention.

In FIG. 5, the bearer path, access signaling leg, and remote signaling leg for a call originated from the user element 16 to the remote endpoint 36 are shown. In this embodiment, the user element 16 is homed to the home MS 12H and roaming into the visited CS 14. The remote endpoint 36 is being served directly or indirectly by the VMSC 22 instead of the home MS 12H. When the visited CS 14 is not proximate to the home MS 12H, call signaling is still anchored at the CCF 30 in the home MS 12H. However, the TDM portion of the bearer path is not established through the media gateway 26H in the home MS 12H and looped back to the VMSC 22. Instead, the TDM portion of the bearer path is established through the media gateway 26L in the local MS 12L, which is more proximate to the visited CS 14 than the home MS 12H, and looped back to the VMSC 22.

The access signaling leg to the CCF 30 is established via the VMSC 22 in the visited CS 14, the media gateway controller 24L of the media gateway 26L in the local MS 12L, an interrogating CSCF (I-CSCF) 38L in the local MS 12L, and the I/S-CSCF 28 in the home MS 12H. The remote signaling leg toward the remote endpoint 36 is established from the CCF 30 via the I/S-CSCF 28, a border gateway control function (BGCF) 40H in the home MS 12H, a BGCF 40L in the local MS 12L, the media gateway controller 24L and the VMSC 22. As such, the present invention establishes the bearer path through the media gateway 26L in the local MS 12L, which is proximate to the visited CS 14 instead of through the media gateway 26H in the home MS 12H, to provide more efficient bearer path routing when the home MS 12H is not proximate to the visited CS 14. As illustrated, the entire bearer path is TDM and routed in an efficient fashion, yet control of the call is maintained by the CCF 30.

Figure 6A:
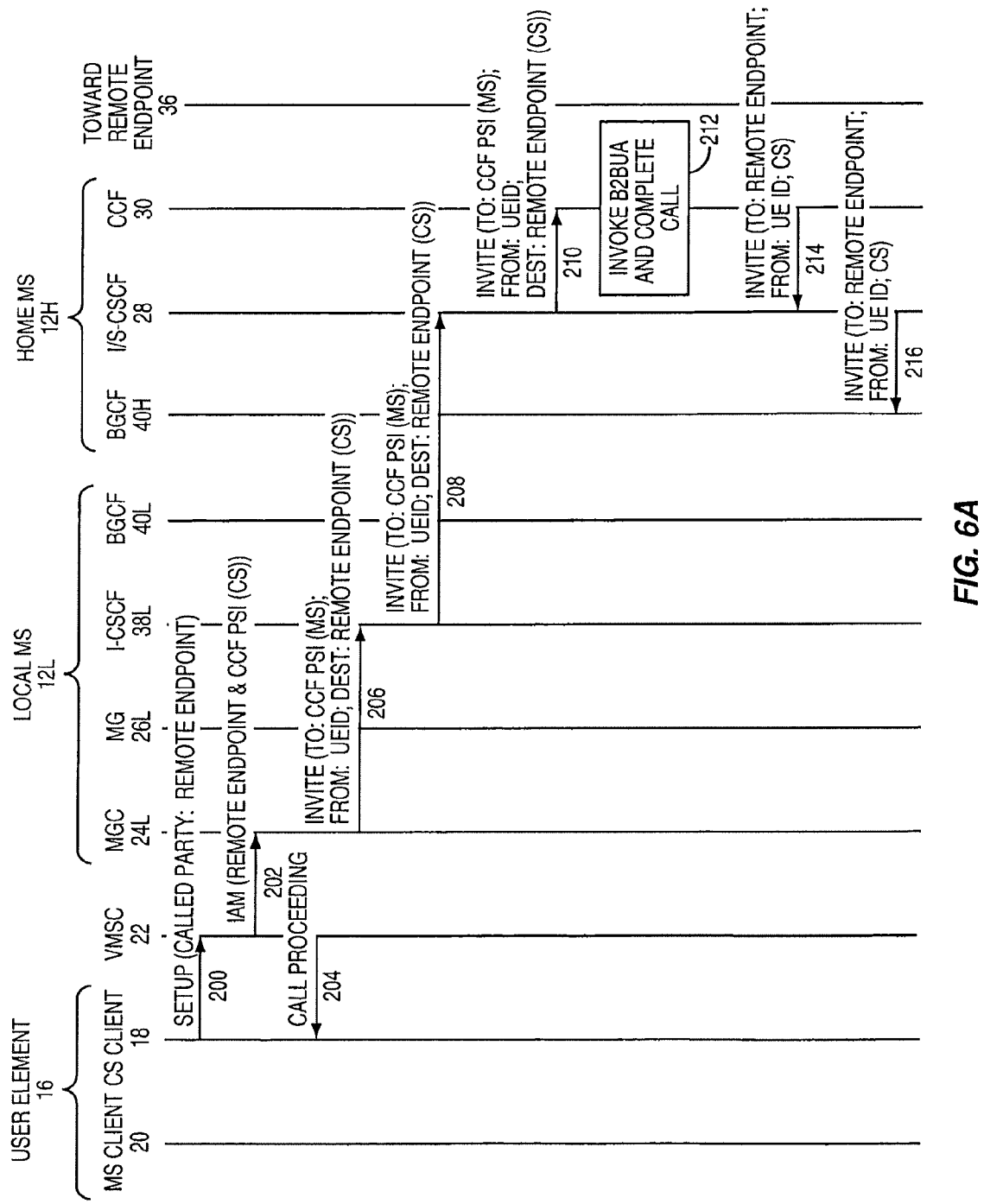
FIGS. 6A-6C show a communication flow illustrating originating a call via the circuit-switched subsystem according to another embodiment of the present invention.
Figure 6B:
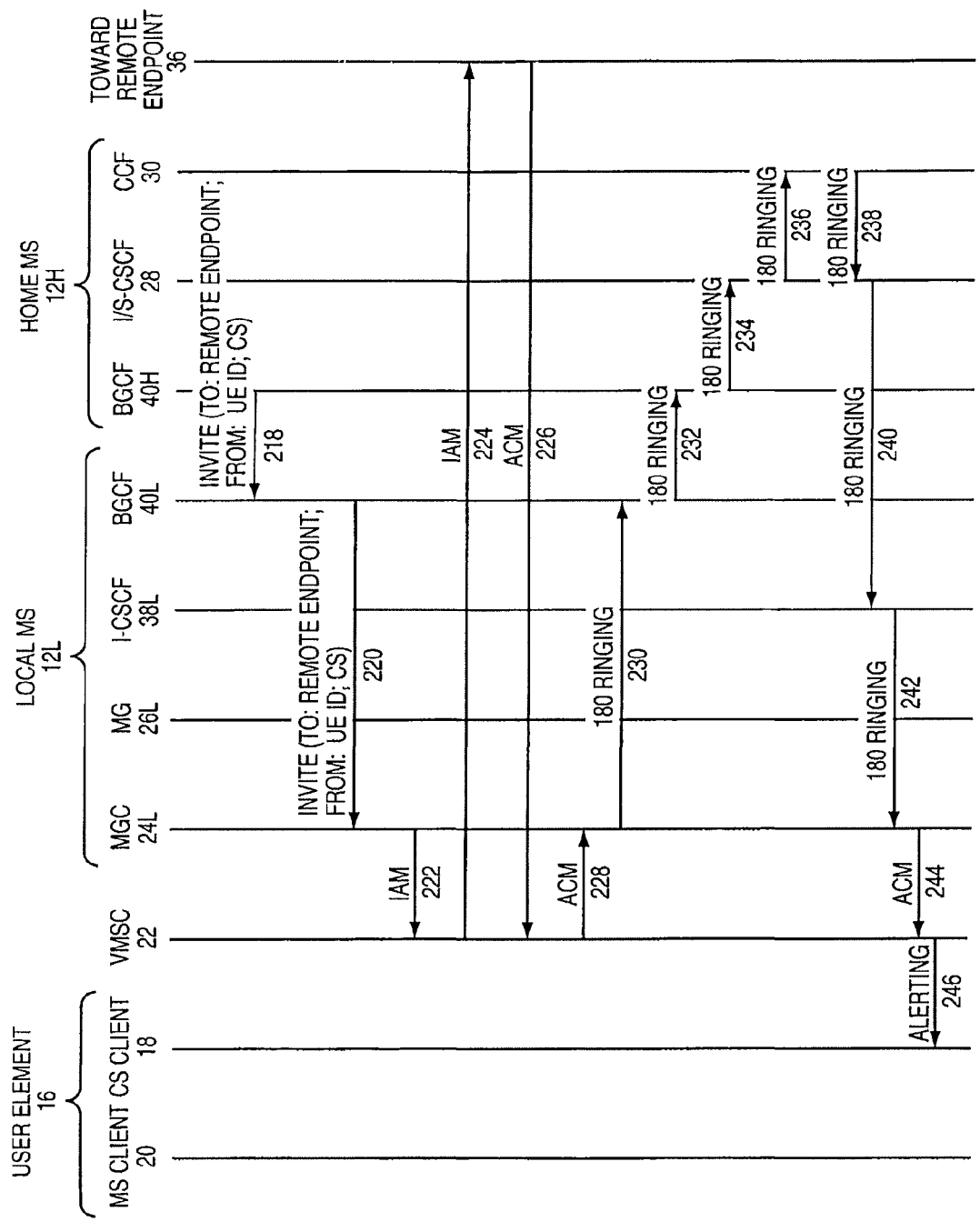
Figure 6C:
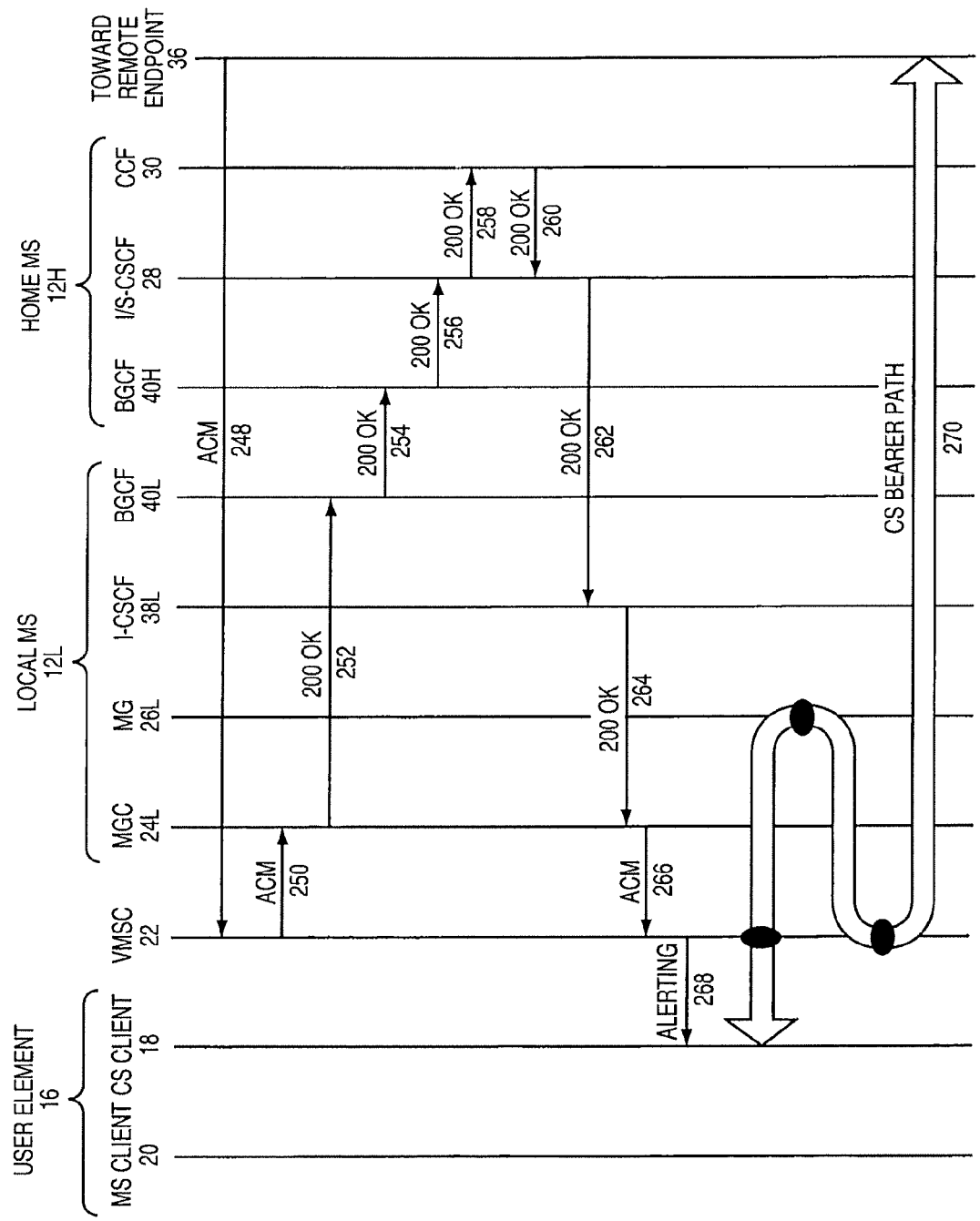

With reference to FIGS. 6A through 6C, a communication flow is provided to illustrate origination of a call from the CS client 18 of the user element 16 via the visited CS 14 according to one embodiment of the present invention. The user element 16 is homed to the home MS 12H and roaming into the visited CS 14. The remote endpoint 36 is being served directly or indirectly by the VMSC 22 instead of the home MS 12H. Initially, the CS client 18 will send a call setup message to its supporting VMSC 22 in the visited CS 14 (step 200). The call setup message will identify the directory number of the remote endpoint 36. The VMSC 22 is provisioned to initially route the call through the more proximate local MS 12L instead of the more distant home MS 12H. As such, the VMSC 22 will send the media gateway controller 24L in the local MS 12L an Integrated Services User Part (ISUP) Initial Address Message (IAM) addressing a routing number that identifies the remote endpoint 36, as well as including the CS PSI for the CCF 30, which is located in the home MS 12H (step 202). The VMSC 22 will also provide a Call Proceeding message back to the CS client 18 of the user element 16 to indicate the call is progressing (step 204). This exchange results in a TDM-based CS bearer path being established from the CS client 18 to the media gateway 26L in the local MS 12L via the VMSC 22.

Upon receiving the IAM from the VMSC 22, the media gateway controller 24L will send an Invite to the I-CSCF 38L in the local MS 12L (step 206). When generating the Invite, the media gateway controller 24L will identify the MS-based PSI for the CCF 30 in light of the CS-based PSI received in the IAM. The MS-based PSI for the CCF 30 is the address to which the Invite is intended. The Invite will also identify the user element 16 as the originator of the call and identify the remote endpoint 36 as the destination for the call. The Invite may also indicate that the call was originated through the CS 14.

Upon receipt of the Invite, the I-CSCF 38L will identify the home MS 12H of the user element 16 and send an Invite to the I/S-CSCF 28 in the home MS 12H to initiate establishment of the call to the remote endpoint 36 (step 208). The I/S-CSCF 28 will recognize the need to invoke the CCF 30 for the call, and will send the Invite to the CCF 30 (step 210), which may invoke a back-to-back user agent (B2BUA) and then take the necessary steps to complete the call (step 212). As such, the CCF 30 will send an Invite back to the I/S-CSCF 28 to complete the call (step 214). The Invite will include the address, which may be a directory number, of the remote endpoint 36 to which the call is directed and be sent to the media gateway controller 24L via the BGCF 40H in the home MS 12H and the BGCF 40L in the local MS 12L (steps 216, 218, and 220).

The media gateway controller 24L will then initiate a TDM-based call toward the remote endpoint 36 by sending an IAM toward the VMSC 22 (step 222), which will send an IAM toward the VMSC 22 via a gateway MSC (not shown) currently serving the remote endpoint 36 (step 224). In response, the VMSC 22 will receive an ACM (step 226) and send an ACM to the media gateway controller 24L to indicate that the call is progressing (step 228). The media gateway controller 24L will initiate a 180 Ringing message, which is routed along the remote signaling leg to the CCF 30 via the BGCF 40L, BGCF 40H, and I/S-CSCF 28 (steps 230, 232, 234, and 236). The CCF 30 will forward the 180 Ringing message along the access signaling leg back to the media gateway controller 24L via the I/S-CSCF 28 and I-CSCF 38L (steps 238, 240 and 242). In response, the media gateway controller 24L will send an ACM to the VMCS 22 (step 244), which will send an alerting message to the CS client 18 of the user element 16 to indicate that the call is being presented to the remote endpoint 36 (246).

Once the call is answered, an ACM is received by the VMSC 22 from the gateway or MSC (not shown) serving the remote endpoint 36 (step 248). The VMSC 22 will send an ACM to the media gateway controller 24L (step 250), which will route a 200 OK message toward the CCF 30 over the remote signaling leg via the BGCF 40L, BGCF 40H, and the I/S-CSCF 28 (steps 252, 254, 256, and 258). The CCF 30 will forward the 200 OK along the access signaling leg back to the media gateway controller 24L via the I/S-CSCF 28 and I-CSCF 38L (steps 260, 262, and 264). In response, the media gateway controller 24L will send an ANM to the VMSC 22 (step 266), which will send an alerting message to the CS client 18 of the user element 16 to indicate that the call has been answered (step 268). During this process the media gateway controller 24L will instruct the media gateway 26L to establish a TDM-based CS bearer path between the VMSC 22 and the gateway or MSC (not shown) serving the remote endpoint 36 (step 270). The CS bearer path extends from the CS client 18 of the user element 16 to the media gateway 26L through the VMSC 22 and on to the remote endpoint 36 back through the VMSC 22. As such, the TMD-based bearer path is not routed through the media gateway 26H in the home MS 12H to improve routing efficiency; however, call signaling is routed through the home MS 12H to allow anchoring at the CCF 30.

Figure 7:
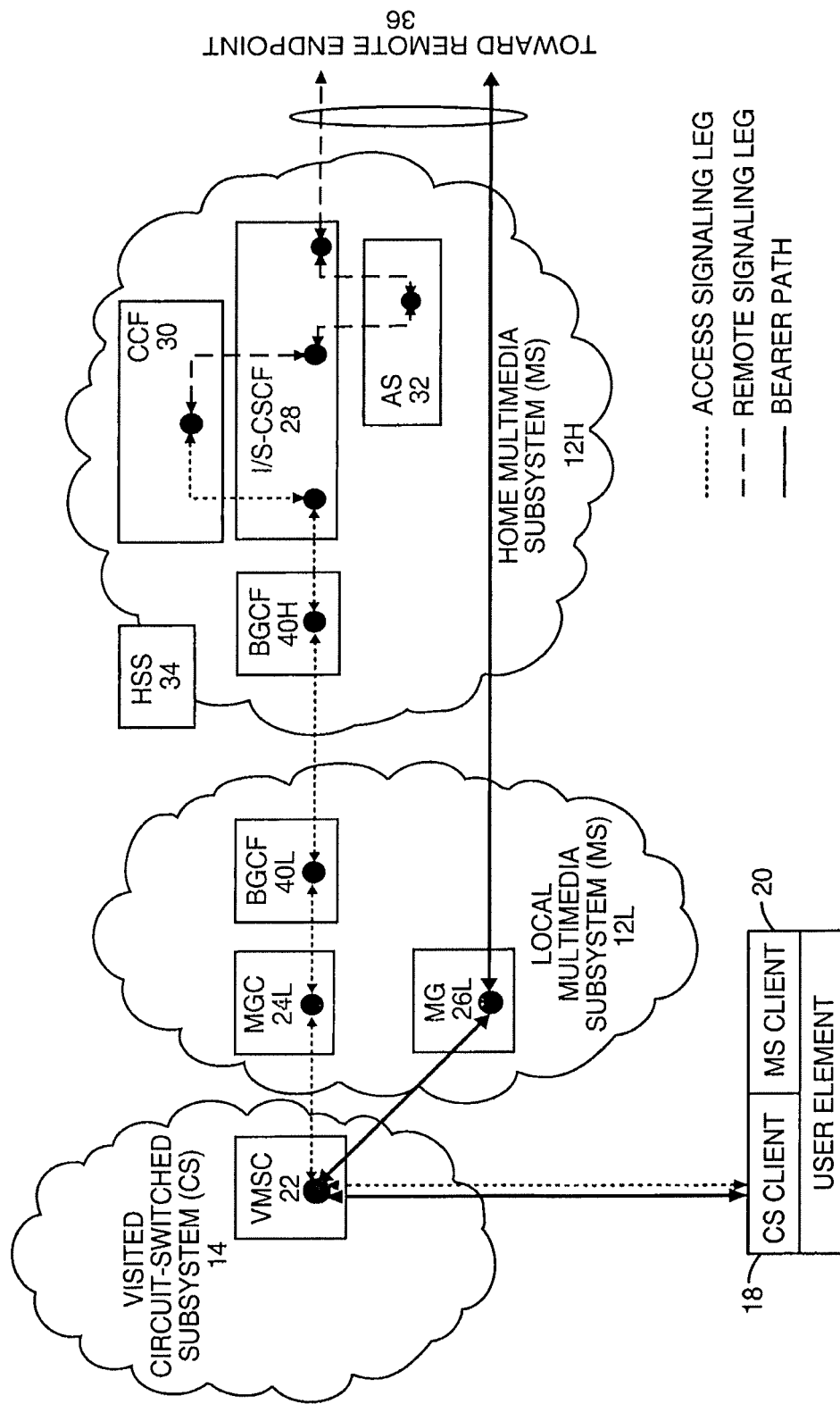
FIG. 7 is a communication environment illustrating circuit-switched subsystem access for a user element according to a third embodiment of the present invention.

In FIG. 7, the bearer path, access signaling leg, and remote signaling leg for a call terminated at the user element 16 from a call originated from the remote endpoint 36 are shown. In this embodiment, the user element 16 is homed to the home MS 12H and roaming into the visited CS 14. The remote endpoint 36 is currently being served by the home MS 12H. When the visited CS 14 is not proximate to the home MS 12H, call signaling is still anchored at the CCF 30 in the home MS 12H. However, the TDM portion of the bearer path is not established from the media gateway 26H in the home MS 12H. Instead, the TDM portion of the bearer path is established from the media gateway 26L in the local MS 12L, which is more proximate to the visited CS 14 than the home MS 12H, to the VMSC 22. The packet portion of the bearer path is established to the media gateway 26L from the remote endpoint 36 via the home MS 12H.

The access signaling leg from the CCF 30 toward the user element 16 is established from the CCF 30 via the I/S-CSCF 28, the BGCF 40H in the home MS 12H, the BGCF 40L in the home MS 12L, the media gateway controller 24L, and the VMSC 22. As such, the present invention establishes the bearer path through the media gateway 26L in the local MS 12L, which is proximate to the visited CS 14, instead of through the media gateway 26H in the home MS 12H to provide more efficient bearer path routing when the home MS 12H is not proximate to the visited CS 14. Control of the call is maintained at the CCF 30.

Figure 8A:
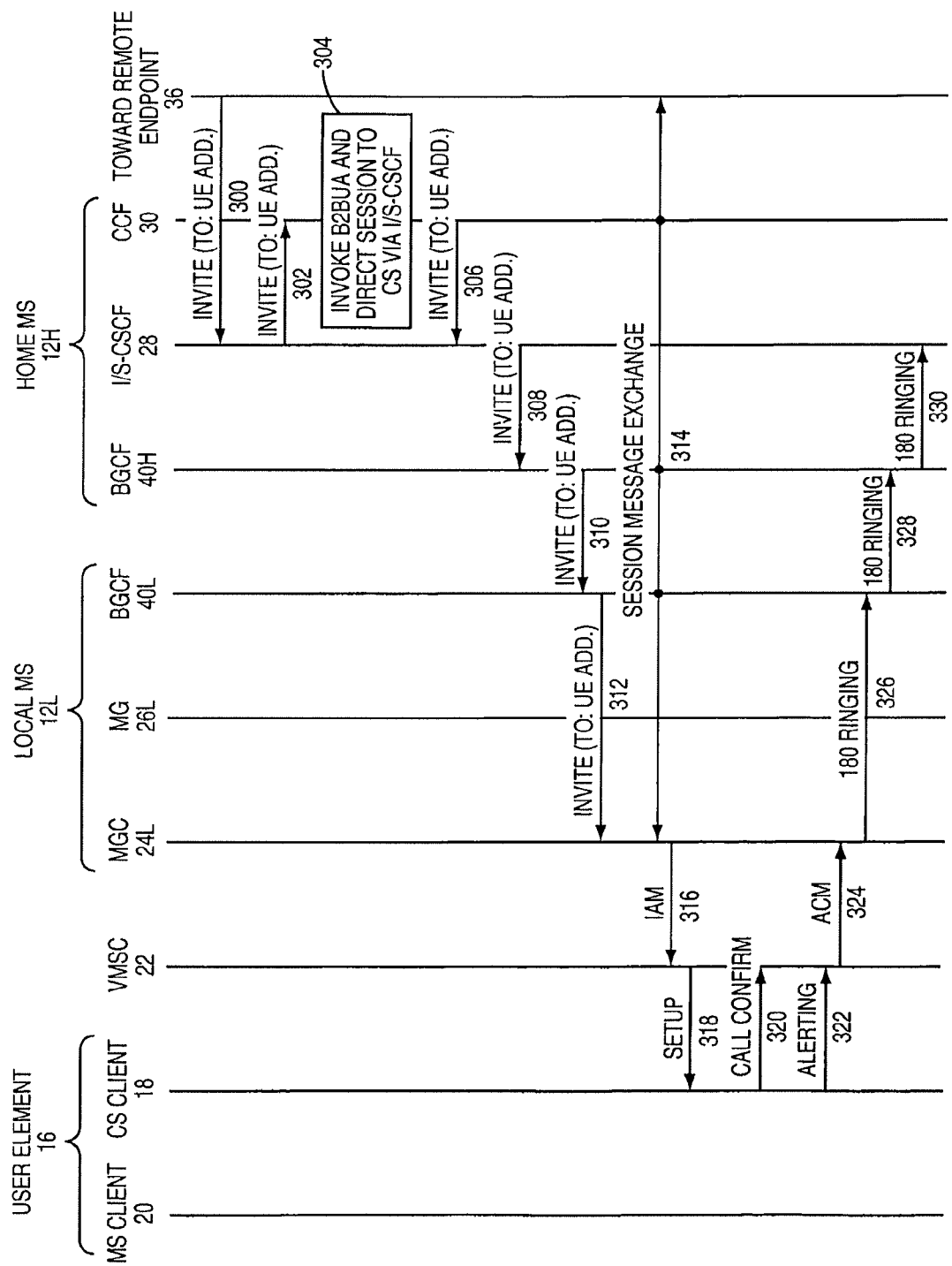
FIGS. 8A and 8B show a communication flow illustrating terminating an incoming call via the circuit-switched subsystem according to one embodiment of the present invention.
Figure 8B:
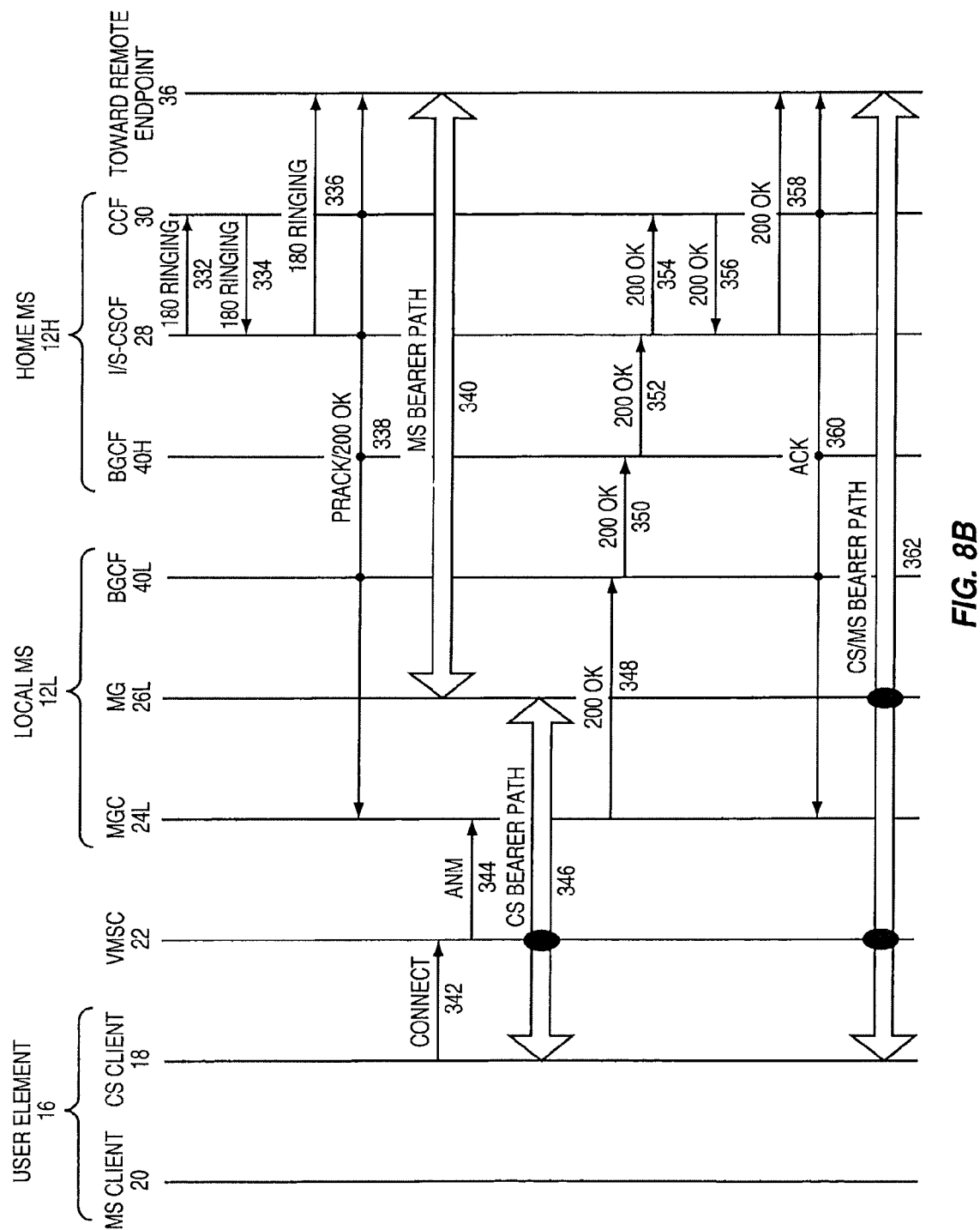

With reference to FIGS. 8A and 8B, a communication flow for terminating a call to the user element 16 via the visited CS 14 is provided. In this example, assume that the call is initiated from a remote endpoint 36 served by the home MS 12H. Further assume that the user element 16 is homed to the home MS 12H and roaming in the visited CS 14. As such, an Invite from the remote endpoint 36 is delivered to the I/S-CSCF 28 in the home MS 12H (step 300). The Invite will identify the address of the user element 16. Applying the appropriate filter criteria to the Invite will result in the I/S-CSCF 28 forwarding the Invite to the CCF 30 (step 302). Again, the filter criteria may be obtained from the HSS 34, and will direct the I/S-CSCF 28 to invoke the CCF 30 as a service required for call signaling. The CCF 30 may also access information from the HSS 34. The information in the HSS 34 may indicate that the user element 16 is being served by the visited CS 14, and that calls should be routed to the CS client 18 of the user element 16.

As such, the CCF 30 will invoke a back-to-back user agent and direct the session to the visited CS 14 via the I/S-CSCF 28 (step 304). Accordingly, an Invite is sent back to the I/S-CSCF 28 (step 306), which will forward the Invite to the BGCF 40H in the home MS 12H (step 308). The BGCF 40H will forward the Invite to the BGCF 40L in the local MS 12L (step 310). The BGCF 40L will forward the Invite to the media gateway controller 24L (step 312). The requisite session message exchange will then take place between the media gateway controller 24L and the remote endpoint 36 via the BGCF 40L, BGCF 40H, I/S-CSCF 28, and CCF 30 (step 314). The media gateway controller 24L will then send an IAM to the VMSC 22 in the visited CS 14 via an appropriate gateway mobile switching center (not shown) (step 316). The VMSC 22 will send a Setup message to the CS client 18 (step 318) to indicate that an incoming call is being routed to the user element 16. The CS client 18 of the user element 16 will respond by sending a Call Confirmation message to the VMSC 22 (step 320).

When the CS client 18 provides an alert to the user of the user element 16, an Alerting message will also be sent back to the VMSC 22 to indicate that the call is being presented to the user (step 322). The VMSC 22 will send an ACM to the media gateway controller 24L (step 324). In response, the media gateway controller 24L will send a 180 Ringing message to the I/S-CSCF 28 via the BGCF 40L and the BGCF 40H (steps 326, 328, and 330). The I/S-CSCF 28 will send the 180 Ringing message to the CCF 30 (step 332). The CCF 30 will send the 180 Ringing message back to the I/S-CSCF 28 (step 334), which will send the 180 Ringing message toward the remote endpoint 36 (step 336).

In this fashion, the signaling is routed through the CCF 30 by the I/S-CSCF 28. The remote endpoint 36 and the media gateway controller 24L will exchange the PRACK and 200 OK messages via the BGCF 40L, BGCF 40H, I/S-CSCF 28, and CCF 30 (step 338), wherein the packet-based MS bearer path is established between the media gateway 26L and the remote endpoint 36 (step 340). When the user of user element 16 answers the incoming call, the CS client 18 will send a Connect message to the VMSC 22 (step 342), which will send an ANM toward the media gateway controller 24L (step 344). At this point, the TDM-based CS bearer path is established for the CS client 18 of the user element 16 between the VMSC 22 and the media gateway 26L (step 346).

In response, the media gateway controller 24L will send a 200 OK message to the I/S-CSCF 28 via the BGCF 40L and the BGCF 40H (steps 348, 350, and 352). The I/S-CSCF 28 will send the 200 OK message to the CCF 30 (step 354). The CCF 30 will send the 200 OK message back to the I/S-CSCF 28 (step 356), which will send the 200 OK message toward the remote endpoint 36 (step 358). Upon receiving an Acknowledgement (ACK) originated at the remote endpoint 36 (step 360), the media gateway controller 24L will instruct the media gateway 26L in the local MS 12L to effectively connect the CS bearer path and the MS bearer path to form the CS/MS bearer path, which extends between the remote endpoint 36 and the CS client 18 through the media gateway 26L in the local MS 12L and the VMSC 22 (step 362). Notably, the TDM portion of the CS bearer path extends to the media gateway 26L in the local MS 12L and not the media gateway 26H in the home MS 12H.

Figure 9:
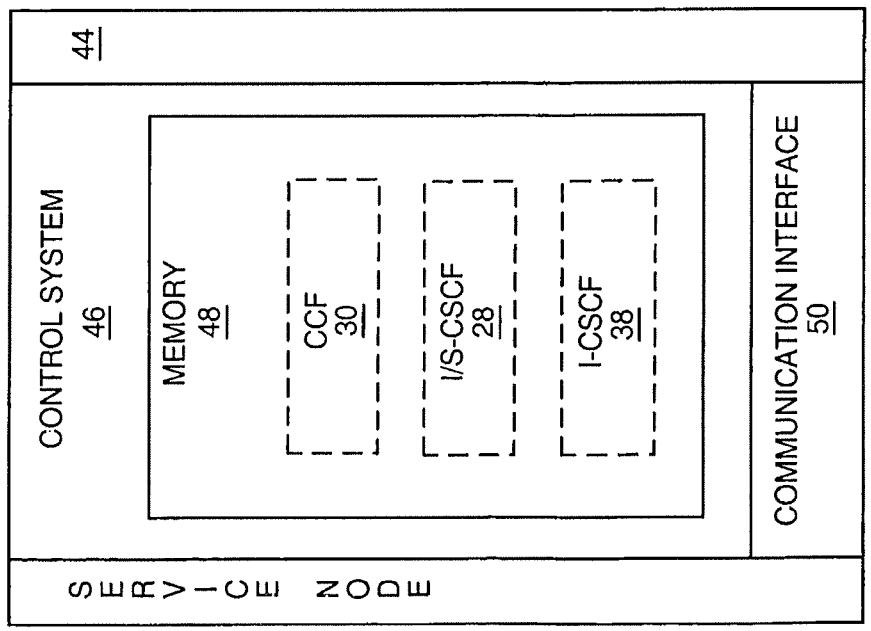
FIG. 9 is a block representation of a service node according to one embodiment of the present invention.

With reference to FIG. 9, a service node 44 is provided according to one embodiment of the present invention. The service node 44 may reside in the MS 12 and include a control system 46 and associated memory 48 to provide the functionality for any one or a combination of the following: the CCF 30, the I-CSCF 38, and the I/S-CSCF 28. The control system 46 will also be associated with a communication interface 50 to facilitate communications with any entity affiliated with the MS 12 or appropriately associated networks.

Figure 10:
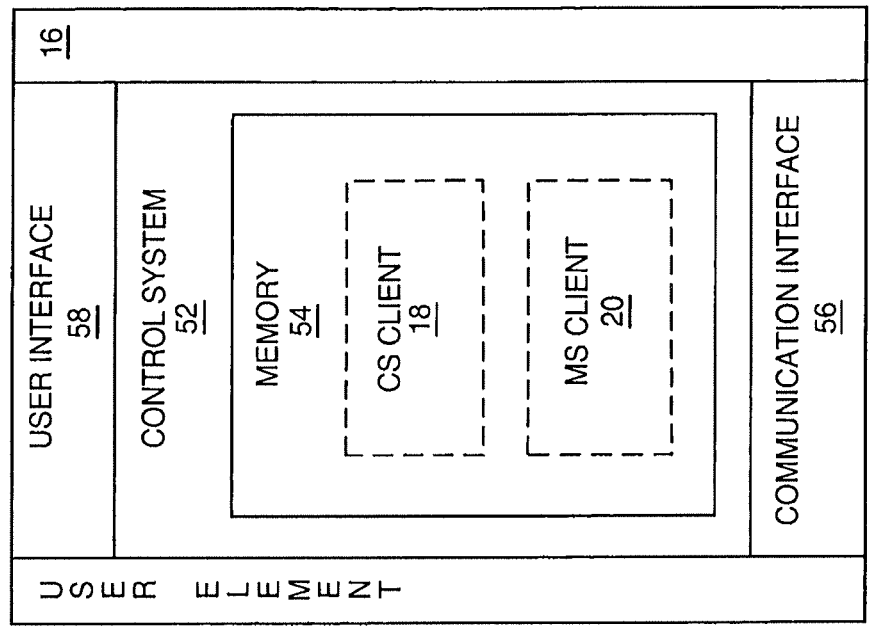
FIG. 10 is a block representation of a user element according to one embodiment of the present invention.

With reference to FIG. 10, a block representation of a user element 16 is provided. The user element 16 may include a control system 52 having sufficient memory 54 to support operation of the CS client 18 and the MS client 20. The control system 52 will cooperate closely with a communication interface 56 to allow the CS client 18 and the MS client 20 to facilitate communications over the CS 14 or the MS 12 as described above. The control system 52 may also be associated with a user interface 58, which will facilitate interaction with the user. The user interface 58 may include a microphone and speaker to facilitate voice communications with the user, as well as a keypad and display to allow the user to input and view information.

Those skilled in the art will recognize improvements and modifications to the preferred embodiments of the present invention. All such improvements and modifications are considered within the scope of the concepts disclosed herein and the claims that follow.

What is claimed is:

1. A method of providing bearer path establishment comprising:
   receiving a Session Initiation Protocol (SIP) INVITE request at an application server (AS) in a first multimedia subsystem providing continuity;
   in response to receiving the SIP INVITE request, establishing a signaling anchor point at the AS for an access signaling leg and a remote signaling leg for a call between a user element served by a visited circuit-switched subsystem and a remote end-point; and
   sending a SIP message from the AS, the message effecting establishment of at least part of a circuit-switched portion of a bearer path for the call via a first gateway in a second multimedia subsystem.

2. The method of claim 1, wherein the SIP message is one of a SIP 200 ok message, a SIP provisional message, a SIP Provisional Acknowledgement message, or a SIP response message to the SIP INVITE request.

3. The method of claim 1 wherein the bearer path comprises a packet-based portion extending from the first gateway toward the remote endpoint.

4. The method of claim 1 wherein the user element comprises a circuit-switched client and a multimedia subsystem client and further comprising anchoring calls supported by the circuit-switched client and the multimedia subsystem client in the first multimedia subsystem.

5. The method of claim 1 wherein the user element is homed to the first multimedia subsystem and being served by the visited circuit-switched subsystem.

6. An application server comprising:
   a memory for storing computer-executable instructions; and a control system associated with the memory and configured to execute the computer-executable instructions to:
receive a Session Initiation Protocol (SIP) INVITE request at the application server (AS) in a first multimedia subsystem providing continuity;
in response to receipt of the SIP INVITE request, establish a signaling anchor point at the AS for an access signaling leg and a remote signaling leg for a call between a user element served by a visited circuit-switched subsystem and a remote end-point; and
send a SIP message from the AS, the message effecting establishment of at least part of a circuit-switched portion of a bearer path for the call via a first gateway in a second multimedia subsystem.

7. The application server of claim 6, wherein the SIP message is one of a SIP 200 ok message, a SIP provisional message, a SIP Provisional Acknowledgement message, or a SIP response message to the SIP INVITE request.

8. The application server of claim 6 wherein the bearer path comprises a packet-based portion extending from the first gateway toward the remote endpoint.

9. The application server of claim 6 wherein the user element comprises a circuit-switched client and a multimedia subsystem client and further comprising anchoring calls supported by the circuit-switched client and the multimedia subsystem client in the first multimedia subsystem.

10. The application server of claim 6 wherein the user element is homed to the first multimedia subsystem and being served by the visited circuit-switched subsystem.

11. A method of providing bearer path establishment comprising:
sending a Session Initiation Protocol (SIP) INVITE request from a first control function in a first multimedia system;
in response to the SIP INVITE request, effecting a signaling anchor point at an application server (AS) in a second multimedia system for an access signaling leg and a remote signaling leg for a call between a user element served by a visited circuit-switched subsystem and a remote end-point; and
receiving a SIP message at the first control function, the SIP message effecting establishment of at least part of a circuit-switched portion of a bearer path for the call via a first gateway in the second multimedia subsystem.

12. The method of claim 11, wherein the SIP message is one of a SIP 200 ok message, a SIP provisional message, a SIP Provisional Acknowledgement message, or a SIP response message to the SIP INVITE request.

13. The method of claim 11 wherein the bearer path comprises a packet-based portion extending from the first gateway toward the remote endpoint.

14. The method of claim 11 wherein the user element comprises a circuit-switched client and a multimedia subsystem client and further comprising anchoring calls supported by the circuit-switched client and the multimedia subsystem client in the first multimedia subsystem.

15. The method of claim 11 wherein the user element is homed to the first multimedia subsystem and being served by the visited circuit-switched subsystem.

16. A control function node comprising:
a memory for storing computer-executable instructions; and
a control system associated with the memory and configured to execute the computer-executable instructions to:
send a Session Initiation Protocol (SIP) INVITE request from a first control function in a first multimedia system;
in response to the SIP INVITE request, effect a signaling anchor point at an application server (AS) in a second multimedia system for an access signaling leg and a remote signaling leg for a call between a user element served by a visited circuit-switched subsystem and a remote end-point; and
receive a SIP message at the first control function, the SIP message effecting establishment of at least part of a circuit-switched portion of a bearer path for the call via a first gateway in the second multimedia subsystem.

17. The control function node of claim 16, wherein the SIP message is one of a SIP 200 ok message, a SIP provisional message, a SIP Provisional Acknowledgement message, or a SIP response message to the SIP INVITE request.

18. The control function node of claim 16 wherein the bearer path comprises a packet-based portion extending from the first gateway toward the remote endpoint.

19. The control function node of claim 16 wherein the user element comprises a circuit-switched client and a multimedia subsystem client and further comprising anchoring calls supported by the circuit-switched client and the multimedia subsystem client in the first multimedia subsystem.

20. The control function node of claim 16 wherein the user element is homed to the first multimedia subsystem and being served by the visited circuit-switched subsystem.

\* \* \* \* \*